United States Patent
Yoshino et al.

(10) Patent No.: US 12,382,861 B2
(45) Date of Patent: Aug. 12, 2025

(54) ROUTE PLANNING DEVICE AND ROUTE PLANNING METHOD

(71) Applicant: HONDA MOTOR CO., LTD., Tokyo (JP)

(72) Inventors: Hiroki Yoshino, Wako (JP); Keigo Tanaka, Kawasaki (JP)

(73) Assignee: HONDA MOTOR CO., LTD., Tokyo (JP)

( * ) Notice: Subject to any disclaimer, the term of this patent is extended or adjusted under 35 U.S.C. 154(b) by 284 days.

(21) Appl. No.: 18/192,747

(22) Filed: Mar. 30, 2023

(65) Prior Publication Data

US 2024/0329636 A1    Oct. 3, 2024

(51) Int. Cl.
| | |
|---|---|
| A01D 34/00 | (2006.01) |
| A01D 101/00 | (2006.01) |
| G05D 1/644 | (2024.01) |
| G05D 105/15 | (2024.01) |
| G05D 107/20 | (2024.01) |

(52) U.S. Cl.
CPC .......... *A01D 34/008* (2013.01); *G05D 1/644* (2024.01); *A01D 2101/00* (2013.01); *G05D 2105/15* (2024.01); *G05D 2107/23* (2024.01)

(58) Field of Classification Search
CPC .. A01D 34/008; A01D 2101/00; G05D 1/644; G05D 2105/15; G05D 2107/23; G05D 2109/10
See application file for complete search history.

(56) References Cited

U.S. PATENT DOCUMENTS

| | | | | |
|---|---|---|---|---|
| 2016/0274588 | A1* | 9/2016 | Tanaka | G05D 1/0221 |
| 2017/0144702 | A1* | 5/2017 | Dang | B62D 6/001 |
| 2017/0168491 | A1* | 6/2017 | Ishijima | A01B 69/008 |
| 2021/0278855 | A1* | 9/2021 | Sakai | G05D 1/0088 |

FOREIGN PATENT DOCUMENTS

| | | | |
|---|---|---|---|
| JP | H09135621 A | * | 5/1997 |
| JP | 2001-344017 A | | 12/2001 |
| JP | 3814230 B2 | * | 8/2006 |
| JP | 2022003518 A | * | 1/2022 |

\* cited by examiner

*Primary Examiner* — Michael J Zanelli
(74) *Attorney, Agent, or Firm* — Rankin, Hill & Clark LLP (57) ABSTRACT

A route planning device according to the present disclosure acquires target work start position information, target work start posture information, current position information, and current posture information, and generates a movement route for causing a work machine to reach a target work start position in a target work start posture, by combining a forward route along which the work machine moves forward and a backward route along which the work machine moves backward, based on the target work start position information, the target work start posture information, the current position information, and the current posture information.

13 Claims, 9 Drawing Sheets

ROUTE PLANNING DEVICE AND ROUTE PLANNING METHOD

BACKGROUND OF THE INVENTION

Field of the Invention

The present disclosure relates to a route planning device and a route planning method.

Description of the Related Art

JP 2001-344017 A discloses an automatic traveling machine capable of executing lawn mowing while automatically moving based on information indicating a work area to be mowed.

SUMMARY OF THE INVENTION

In order to cause a work machine such as a lawn mower to perform work, the work machine must be moved to a work start position before the work is started. In this regard, there is a long-awaited need for appropriate technology.

The present invention has the object of solving the aforementioned problem.

According to a first aspect of the present invention, there is provided a route planning device comprising one or more processors that execute computer-executable instructions stored in a memory, wherein the one or more processors execute the computer-executable instructions to cause the route planning device to: acquire target work start position information indicating a target work start position that is a target position at which a work machine is caused to start work, target work start posture information indicating a target work start posture that is a target posture of the work machine at the target work start position, current position information indicating a current position of the work machine, and current posture information indicating a posture of the work machine at the current position; and generate a movement route for causing the work machine to reach the target work start position in the target work start posture, by combining a forward route along which the work machine moves forward and a backward route along which the work machine moves backward, based on the target work start position information, the target work start posture information, the current position information, and the current posture information.

According to a second aspect of the present invention, there is provided a route planning method comprising: acquiring target work start position information indicating a target work start position that is a target position at which a work machine is caused to start work, target work start posture information indicating a target work start posture that is a target posture of the work machine at the target work start position, current position information indicating a current position of the work machine, and current posture information indicating a posture of the work machine at the current position; and generating a movement route for causing the work machine to reach the target work start position in the target work start posture, by combining a forward route along which the work machine moves forward and a backward route along which the work machine moves backward, based on the target work start position information, the target work start posture information, the current position information, and the current posture information.

According to the present invention, it is possible to cause the work machine to reach the target work start position in the target work start posture.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

It is possible to derive a global route connecting any two points, based on a route generation algorithm such as rapidly exploring random tree (RRT). When a work machine is located at a place different from a target work start position that is a target position at which the work machine is caused to start work, it is conceivable to derive a route along which the work machine is to be moved from the current position of the work machine to the target work start position, based on a route generation algorithm.

However, route generation algorithms such as RRT do not take into account the posture of the work machine. Therefore, when the work machine is simply moved along the route generated using the route generation algorithm such as the RRT, the posture of the work machine that has reached the target work start position may not be a posture suitable for starting the work. For example, the orientation of the work machine that has reached the target work start position may be opposite to the orientation of the work machine suitable for starting the work. As a result, the work machine cannot start the work smoothly.

As a method for adjusting the posture (orientation) of the work machine, it is conceivable to cause the work machine to make a pivot turn. However, when the pivot turn is made, for example, wheels or the like (not shown) provided in the work machine relatively strongly rub the traveling surface (lawn grass). When the traveling surface (lawn grass) is strongly rubbed by wheels or the like, the traveling surface is damaged. Therefore, it is not preferable to make the pivot turn.

In view of the above-described problems, an embodiment will be described below.

Embodiment

Figure 1:
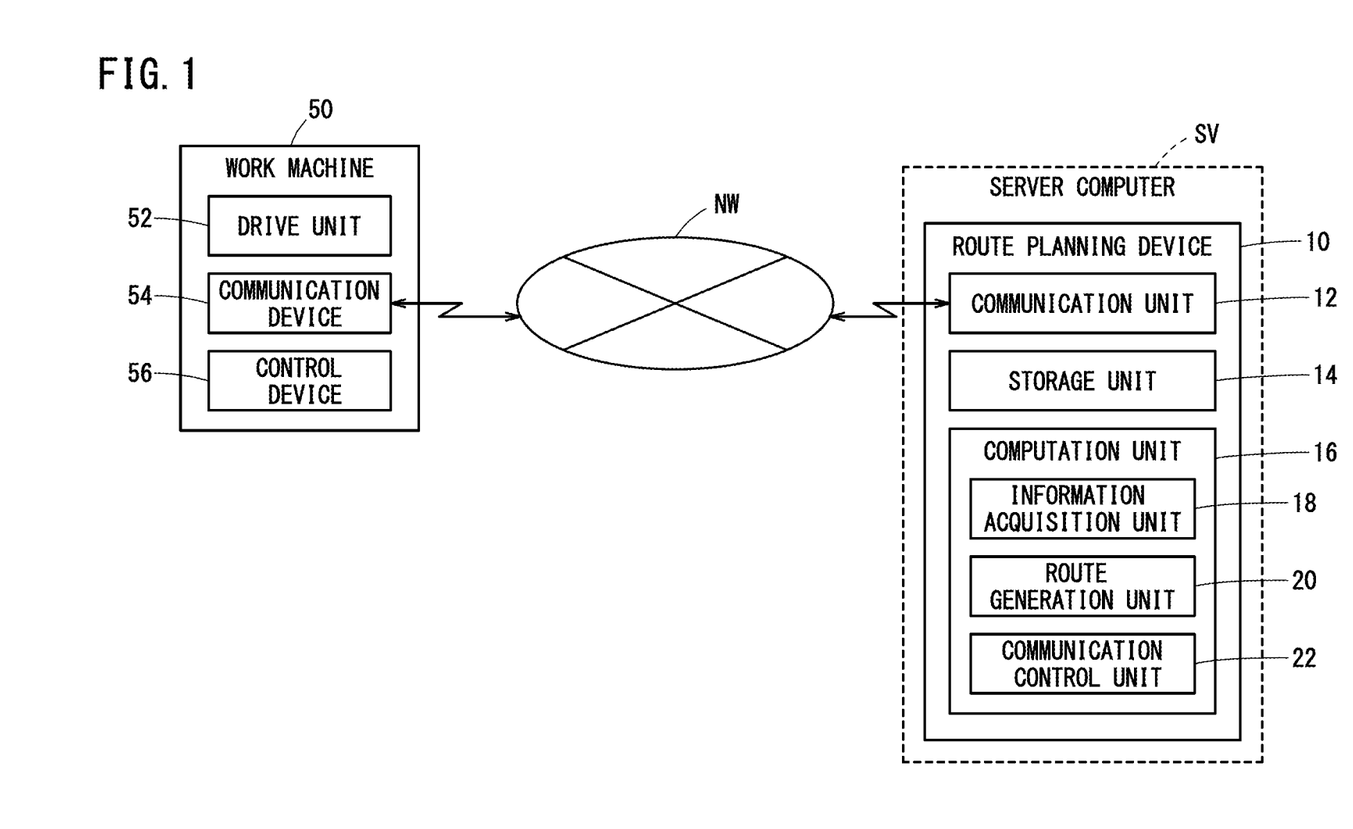
FIG. 1 is a block diagram showing a work machine and a route planning device according to an embodiment.

FIG. 1 is a block diagram showing a work machine 50 and a route planning device 10 according to an embodiment.

The work machine 50 is a machine capable of performing work while autonomously traveling. The work is, for example, lawn mowing. The work machine 50 is, for example, a lawn mower, but is not limited thereto.

The work machine 50 includes a drive unit 52 for performing work. The drive unit 52 includes, for example, a motor (not shown) for driving wheels (not shown) and the like provided in the work machine 50, a rotary cutter (not shown) for mowing, and a motor (not shown) for rotating the rotary cutter, but the present invention is not limited thereto.

The work machine 50 further includes a communication device 54 and a control device 56. The communication device 54 is a device for communicating via a network NW. The network NW is, for example, the Internet, but may be a local area network (LAN). The control device 56 is, for example, an electronic control unit (ECU). The control device 56 includes, for example, a processor, a memory, and the like (not shown). The control device 56 can cause the work machine 50 to autonomously traveling by causing the processor to execute a program stored in the memory, for example. The control device 56 may control the drive unit 52 and the communication device 54 based on a program.

The route planning device 10 is a computer that generates a movement route 108 (described later) for the work machine 50. The route planning device 10 is provided in a server computer SV installed in a data center or the like, for example, but may be provided in the work machine 50 (the control device 56). In the present embodiment, a case where the route planning device 10 is provided in the server computer SV will be described as an example.

The route planning device 10 includes a communication unit 12, a storage unit 14, and a computation unit 16.

The communication unit 12 includes a communication module (not shown). The communication unit 12 is communicably connected to the communication device 54 of the work machine 50 via the network NW.

The storage unit 14 includes, for example, one or more memories. More specifically, the storage unit 14 includes, for example, a nonvolatile memory such as a random access memory (RAM), and a volatile memory such as a read only memory (ROM) and a flash memory. The nonvolatile memory stores, for example, map information, a computer-executable program, and the like. The volatile memory stores, for example, data or the like that is temporarily necessary when a processor (the computation unit 16) described below performs computation based on a program.

The computation unit 16 includes predetermined processing circuitry. The processing circuitry includes one or more processors such as a central processing unit (CPU) and a graphics processing unit (GPU). At least a part of the processing circuitry may be realized by a predetermined integrated circuit such as an application specific integrated circuit (ASIC) or a field-programmable gate array (FPGA).

The computation unit 16 includes an information acquisition unit 18, a route generation unit 20, and a communication control unit 22. The information acquisition unit 18, the route generation unit 20, and the communication control unit 22 are realized by the processor of the computation unit 16 executing a program stored in the memory of the storage unit 14. At least a part of the information acquisition unit 18, the route generation unit 20, and the communication control unit 22 may be realized by the above-described integrated circuit or the like.

The information acquisition unit 18 acquires work area information, target work start position information, target work start posture information, current position information (initial position information), and current posture information (initial posture information).

Figure 2:
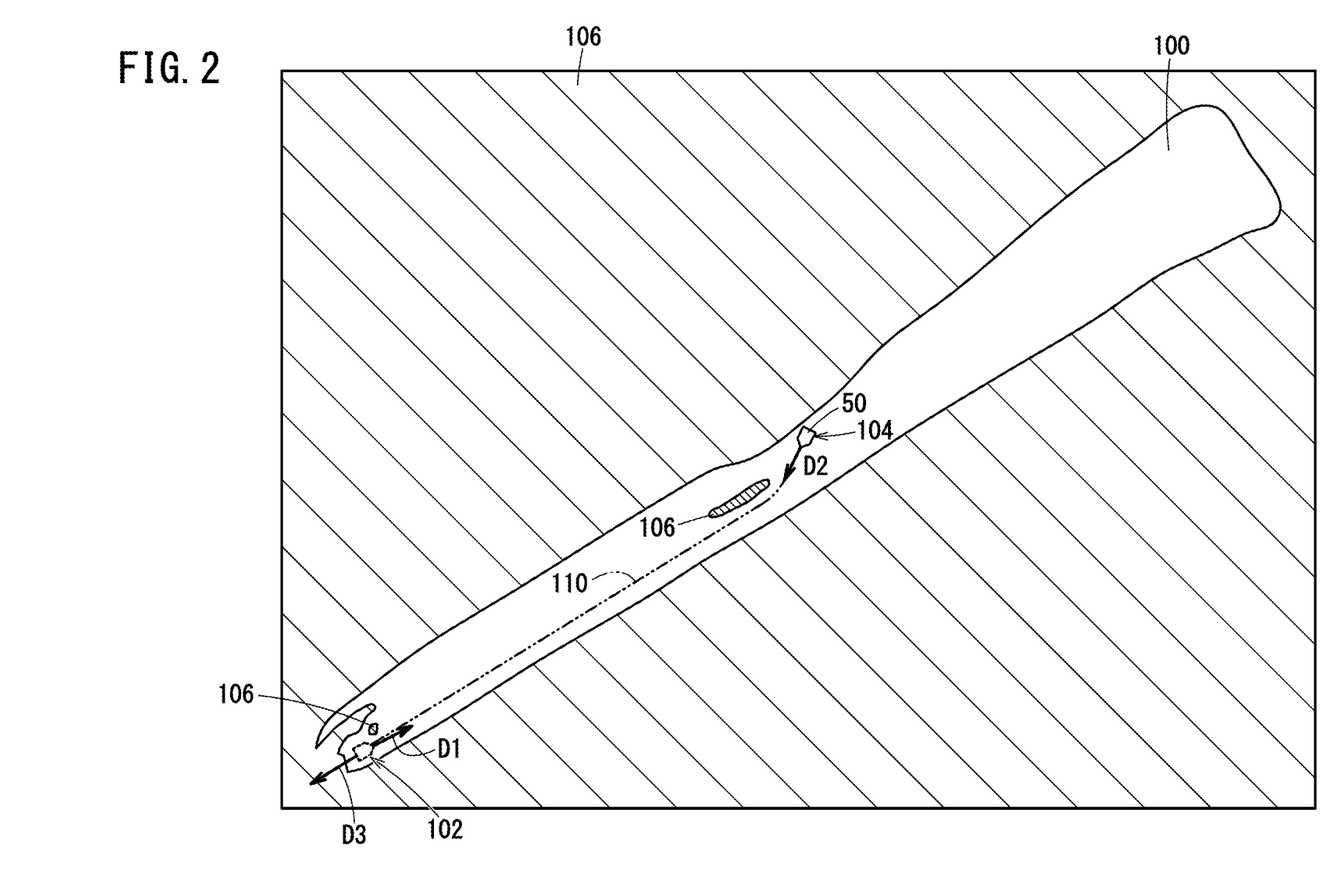
FIG. 2 is a plan view schematically showing a work area.

The work area information is information indicating a work area 100 (see also FIG. 2). The work area 100 is an area in which work is performed by the work machine 50. In a case where the work machine 50 is a lawn mower, the work area 100 is an area where lawn mowing is performed.

FIG. 2 is a plan view schematically showing the work area 100.

The work area 100 is specified based on, for example, teaching data created in advance for playback control of the work machine 50. Therefore, the information acquisition unit 18 can acquire the work area information by acquiring information indicating the teaching data.

FIG. 2 further shows a travel restriction area 106. The travel restriction area 106 is an area in which travel of the work machine 50 is restricted. The travel restriction area 106 can be specified as an area other than the work area 100, based on the work area information. The travel restriction area 106 may also include an area in which an obstacle (rock, fence, or the like) that inhibits travel of the work machine 50 is located.

The target work start position information is information indicating a target work start position 102. The target work start position 102 is a position at which the work machine 50 is planned to start the work. Similarly to the work area 100, the target work start position information is specified based on, for example, teaching data of the work machine 50. The information acquisition unit 18 can acquire the target work start position information by acquiring information indicating the teaching data of the work machine 50.

The target work start posture information is information indicating a target work start posture. The target work start posture is a target posture of the work machine 50 at the target work start position 102. The target work start posture information indicates, as the target work start posture, the orientation (an arrow D1 in FIG. 2) of the work machine 50 at the target work start position 102, for example, but the target work start posture information is not limited thereto.

The target work start posture information is supplied from a user of the work machine 50 to the information acquisition unit 18, for example, but the present invention is not limited thereto. For example, the information acquisition unit 18 may acquire, based on the teaching data described above, information indicating a planned traveling direction of the work machine 50 immediately after the start of the work. The information indicating the planned traveling direction of the work machine 50 immediately after the start of the work indicates the orientation (the arrow D1) of the work machine 50 at the target work start position 102. Therefore, the information indicating the planned traveling direction of the work machine 50 immediately after the start of the work is acquired as the target work start posture information.

The current position information is an initial position of the work machine 50 before starting to move toward the target work start position 102. That is, the current position information is information indicating a current position 104 of the work machine 50. For example, the current position information is supplied from a positioning sensor (not shown) provided in the work machine 50 to the information acquisition unit 18 via the network NW, but the present invention is not limited thereto.

The current posture information is information indicating a current posture (initial posture) which is the posture of the work machine 50 at the current position 104. The current posture information indicates, for example, the orientation (an arrow D2 in FIG. 2) of the work machine 50 at the current position 104, but the current posture information is not limited thereto. The current posture information is supplied to the information acquisition unit 18 via the network NW from, for example, an attitude sensor, a direction sensor, or the like (not shown) provided in the work machine 50, but the present invention is not limited thereto.

The route generation unit 20 generates (creates) the movement route 108 described later, based on the work area information, the target work start position information, the target work start posture information, the current position information, and the current posture information. The movement route 108 is a route for causing the work machine 50 to reach the target work start position 102 in the target work start posture. More specifically, the route generation unit 20 generates the movement route 108, for example, in the manner described below.

The route generation unit 20 generates a global route 110 connecting the current position 104 and the target work start position 102, based on the work area information, the target work start position information, the current position information, and a predetermined route generation algorithm. An example of the global route 110 is shown in FIG. 2.

The predetermined route generation algorithm is, for example, the above-described RRT, but is not limited thereto. The RRT is preferable in that it is an algorithm capable of generating the global route 110 at a relatively high speed.

Based on the work area information, the route generation unit 20 can generate the global route 110 that falls within the range of the work area 100. As a result, it is possible to prevent the work machine 50 from moving within the travel restriction area 106.

However, when the work machine 50 is simply moved along the global route 110, the posture of the work machine 50 at the target work start position 102 may not coincide with the target work start posture. More specifically, as shown in FIG. 2, for example, the orientation (an arrow D3) of the work machine 50 that has reached the target work start position 102 may not coincide with the orientation (the arrow D1) of the work machine 50 for starting the work.

Therefore, in order to cause the work machine 50 to reach the target work start position 102 in the target work start posture, the route generation unit 20 generates the movement route 108 in the manner described below.

Figure 3:
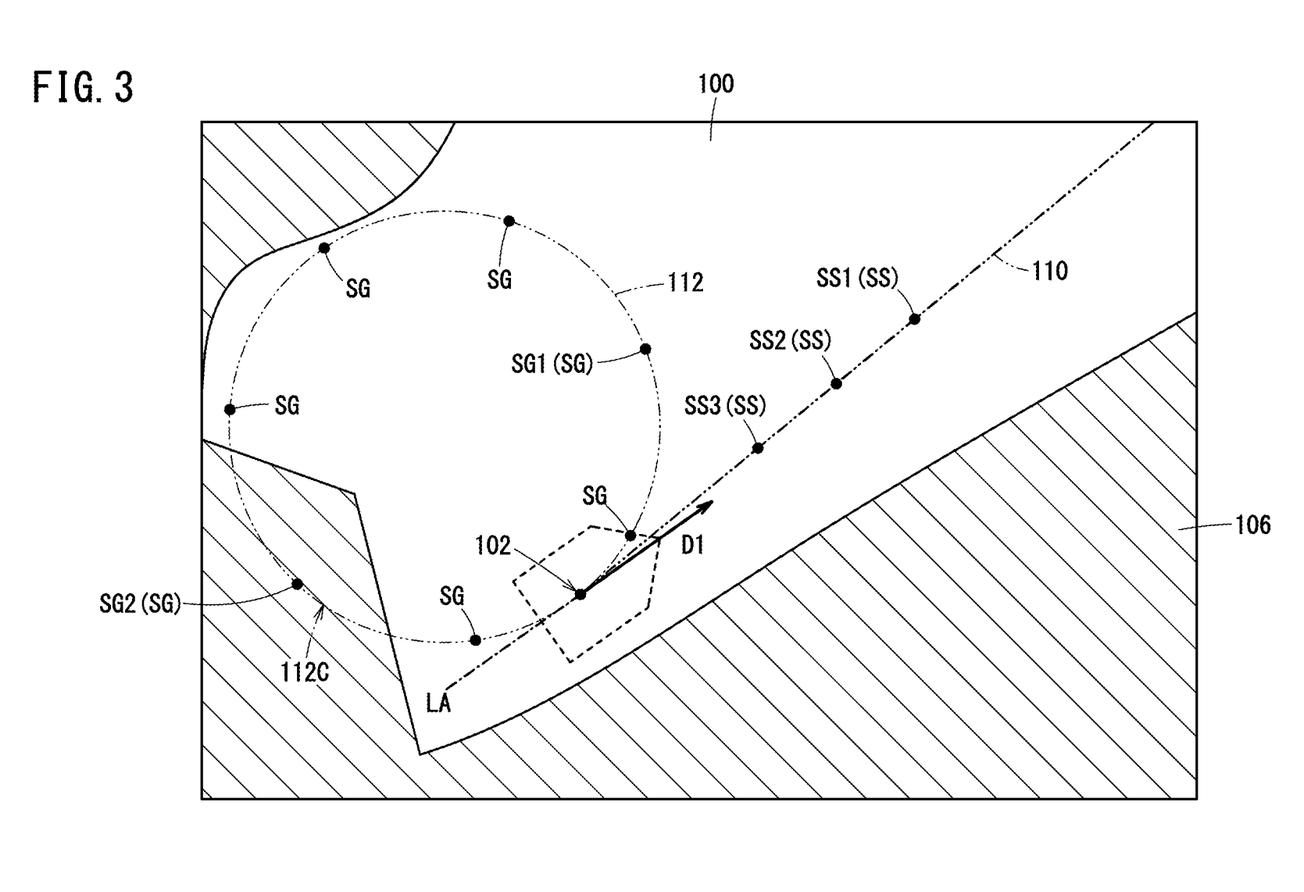
FIG. 3 is a plan view for explaining a method for generating a movement route.

FIG. 3 is a plan view for explaining a method for generating the movement route 108.

The route generation unit 20 generates the movement route 108 by changing a part of the global route 110. The route generation unit 20 sets an imaginary circle 112 as shown in FIG. 3, based on the target work start position information and the target work start posture information. The imaginary circle 112 is an imaginary circle in contact with an imaginary straight line LA. The imaginary straight line LA is an imaginary straight line that extends along the planned traveling direction (the arrow D1) of the work machine 50 indicated by the target work start posture, and that passes through the target work start position 102. A contact point between the imaginary circle 112 and the imaginary straight line LA coincides with the target work start position 102, but the present invention is not limited thereto. The radius of the imaginary circle 112 is equal to, for example, the minimum turning radius of the work machine 50, but is not limited thereto.

In addition, the route generation unit 20 sets a plurality of sub-start position candidates SS (SS1 to SS3) on the global route 110, and sets a plurality of sub-goal position candidates SG (SG1) on a circumference 112C of the imaginary circle 112.

The sub-start position candidate SS is a candidate for a sub-start position set on the movement route 108. The sub-start position is a position at which the work machine 50 starts moving out of the global route 110. The plurality of sub-start position candidates SS are arranged at regular intervals on the global route 110 based on, for example, intervals determined in advance. Note that the sub-start position candidates SS may be set within a range of a predetermined distance from the target work start position 102. As a result, the number of the sub-start position candidates SS can be suppressed, and thus the processing load of the route generation unit 20 when generating a movement route candidate 114 described later can be reduced.

The sub-goal position candidate SG is a candidate for a sub-goal position set on the movement route 108. The sub-goal position is a target position of the work machine 50 at the time when the work machine 50 moves from the global route 110 to the imaginary circle 112. Further, the sub-goal position is a turning point at which the work machine 50 that has reached the imaginary circle 112 turns toward the target work start position 102. The plurality of sub-goal position candidates SG are arranged at regular intervals on the circumference 112C of the imaginary circle 112 based on, for example, intervals determined in advance.

Note that the sub-goal position candidates SG may be set within a range of a predetermined distance from the target work start position 102. As a result, the number of the sub-goal position candidates SG can be suppressed, and thus the processing load of the route generation unit 20 when generating the movement route candidate 114 described later can be reduced.

Further, the route generation unit 20 does not set the sub-goal position candidates SG in the travel restriction area 106. Alternatively, the route generation unit 20 does not use the sub-goal position candidates SG included within the travel restriction area 106 to generate the movement route 108.

Each of FIGS. 4 to 8 is a plan view for explaining the method for generating the movement route 108.

Based on the work area information, the current posture information, the sub-start position candidate SS, and the sub-goal position candidate SG, the route generation unit 20 generates the movement route candidate 114, which is a candidate for the movement route 108. Specifically, based on the work area information, the route generation unit 20 generates the movement route candidate 114 such that the movement route candidate 114 is included in the work area 100.

The movement route candidate 114 includes a first sub-route candidate 116. The first sub-route candidate 116 is a candidate for a route along which the work machine 50 is to be moved from the sub-start position candidate SS to the sub-goal position candidate SG. For example, the first sub-route candidate 116 is generated such that the orientation of the work machine 50 that has reached the sub-goal position candidate SG is along an imaginary straight line LB. The imaginary straight line LB is an imaginary straight line in contact with the imaginary circle 112 at the sub-goal position candidate SG. The orientation of the work machine 50 at the time of reaching the sub-goal position candidate SG can be predicted based on the current posture information.

The first sub-route candidate 116 includes, for example, a forward route 118 along which the work machine 50 is moved forward, but the present invention is not limited thereto. The first sub-route candidate 116 may include a backward route 120 along which the work machine 50 is moved backward. The forward route 118 is, for example, a route along which the work machine 50 turns forward, but is not limited thereto. The backward route 120 is, for example, a route along which the work machine 50 turns backward, but is not limited thereto.

As shown in FIGS. 4 to 8, the route generation unit 20 can generate the first sub-route candidate 116 in accordance with a combination of the sub-start position candidate SS and the sub-goal position candidate SG.

Figure 4:
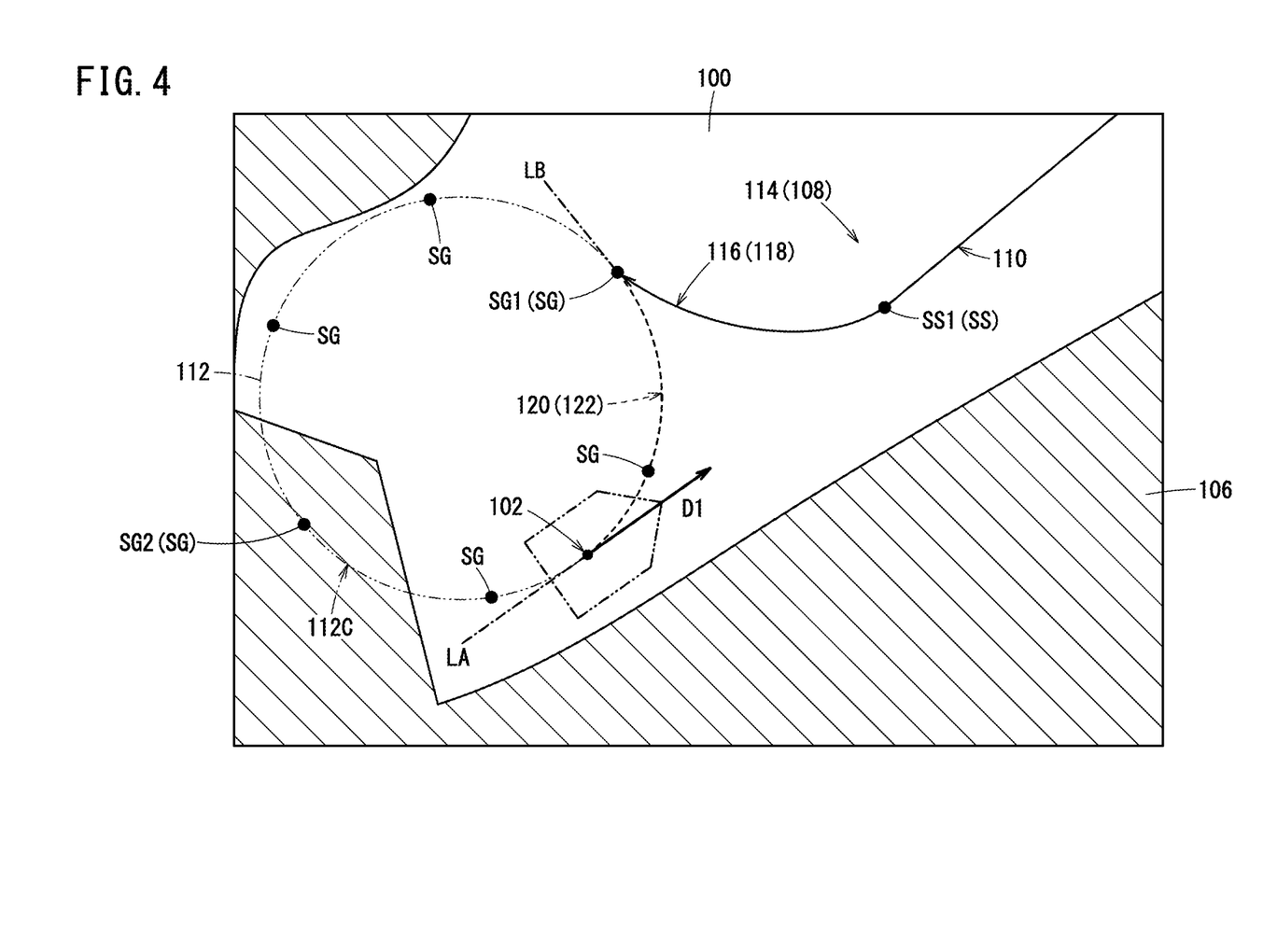
FIG. 4 is a plan view for explaining the method for generating the movement route.

FIG. 4 shows an example of a case where the radius of an imaginary arc from the sub-start position candidate SS1 to the sub-goal position candidate SG1 is larger than the minimum turning radius of the work machine 50. In such a case, as shown in FIG. 4, the route generation unit 20 can form a route from the sub-start position candidate SS1 to the sub-goal position candidate SG1 by only one forward route 118. That is, in such a case, the simple first sub-route candidate 116 as shown in FIG. 4 can be generated. The first sub-route candidate 116 as shown in FIG. 4 does not require the work machine 50 to make a turn during moving from the sub-start position candidate SS1 to the sub-goal position candidate SG1.

Figure 5:
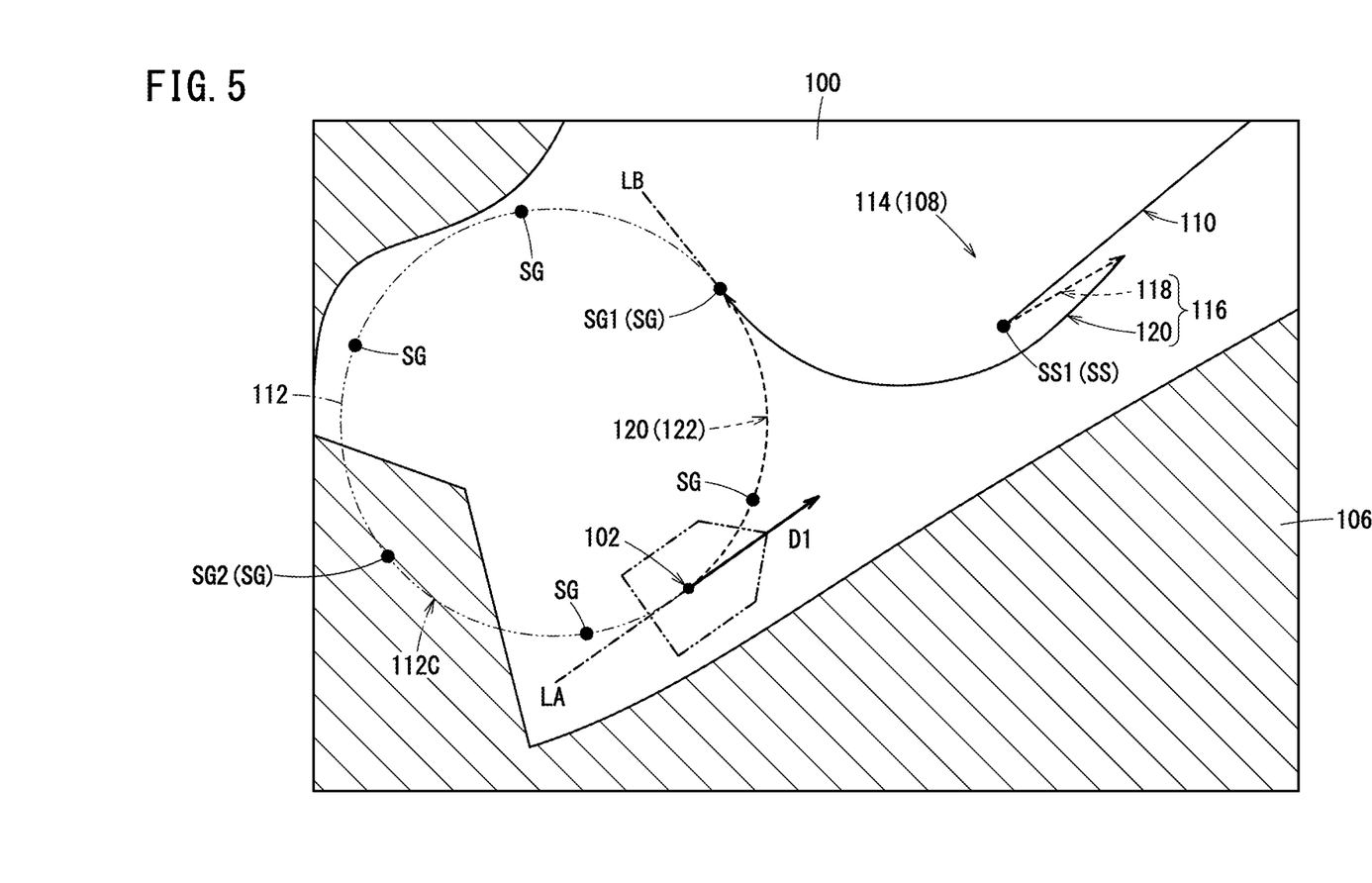
FIG. 5 is a plan view for explaining the method for generating the movement route.

FIG. 5 shows an example of a case where the radius of the imaginary arc from the sub-start position candidate SS1 to the sub-goal position candidate SG1 is smaller than the minimum turning radius of the work machine 50. In such a case, as shown in FIG. 5, the route generation unit 20 generates the first sub-route candidate 116 by combining the forward route 118 and the backward route 120. The first sub-route candidate 116 formed by combining the forward route 118 and the backward route 120 requires the work machine 50 to make a turn during moving from the sub-start position candidate SS1 to the sub-goal position candidate SG1.

Figure 6:
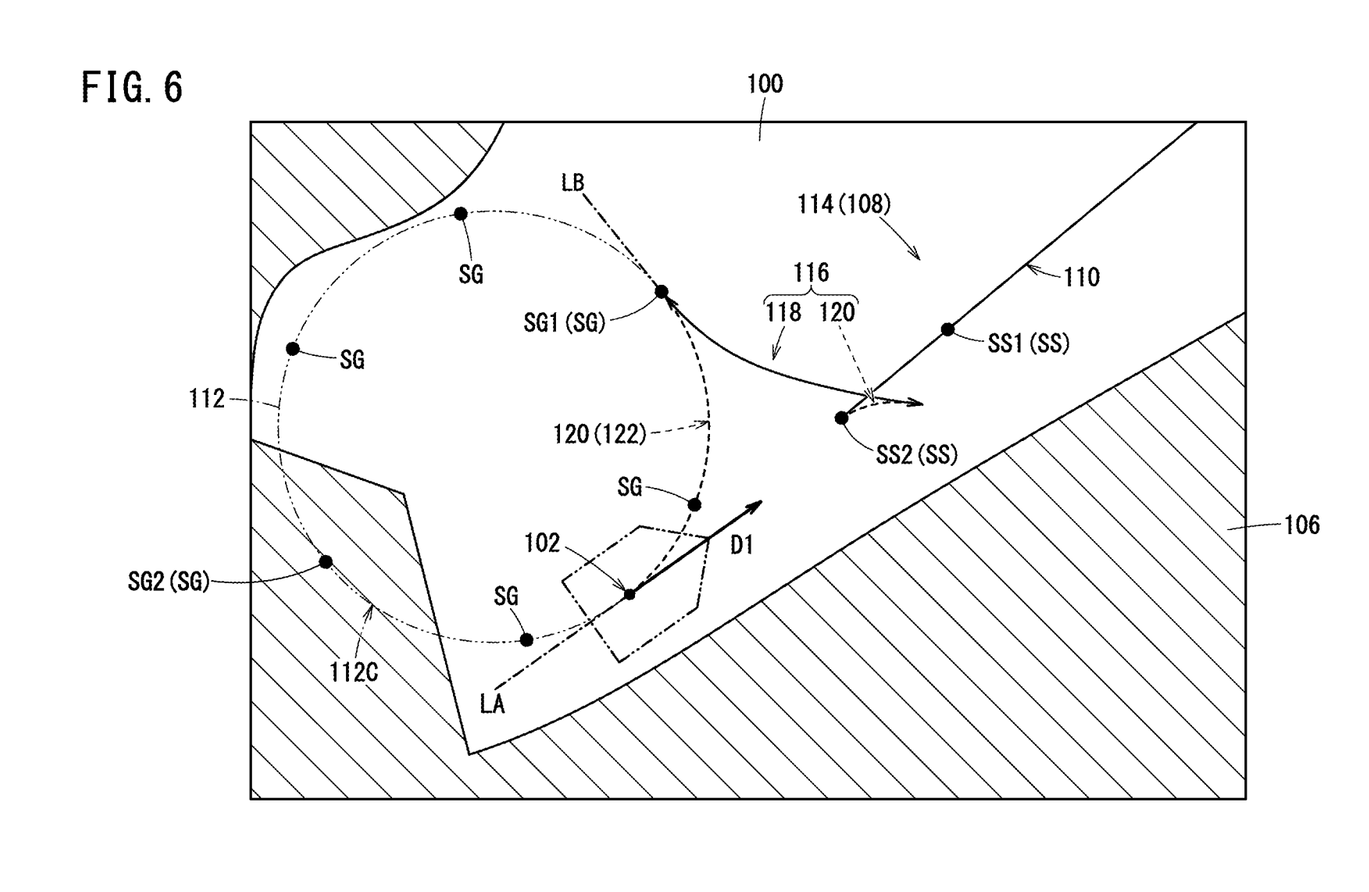
FIG. 6 is a plan view for explaining the method for generating the movement route.
Figure 7:
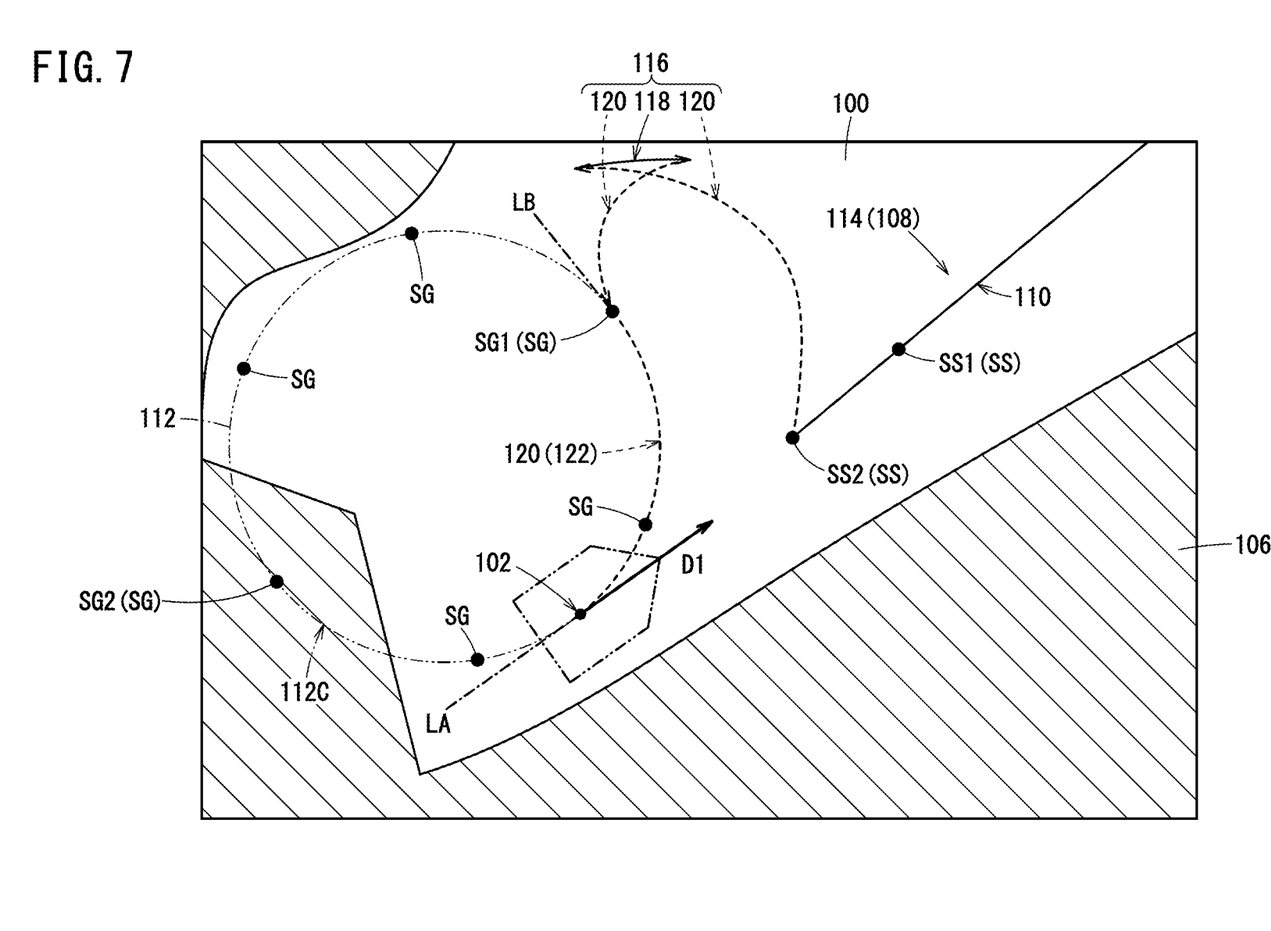
FIG. 7 is a plan view for explaining the method for generating the movement route.
Figure 8:
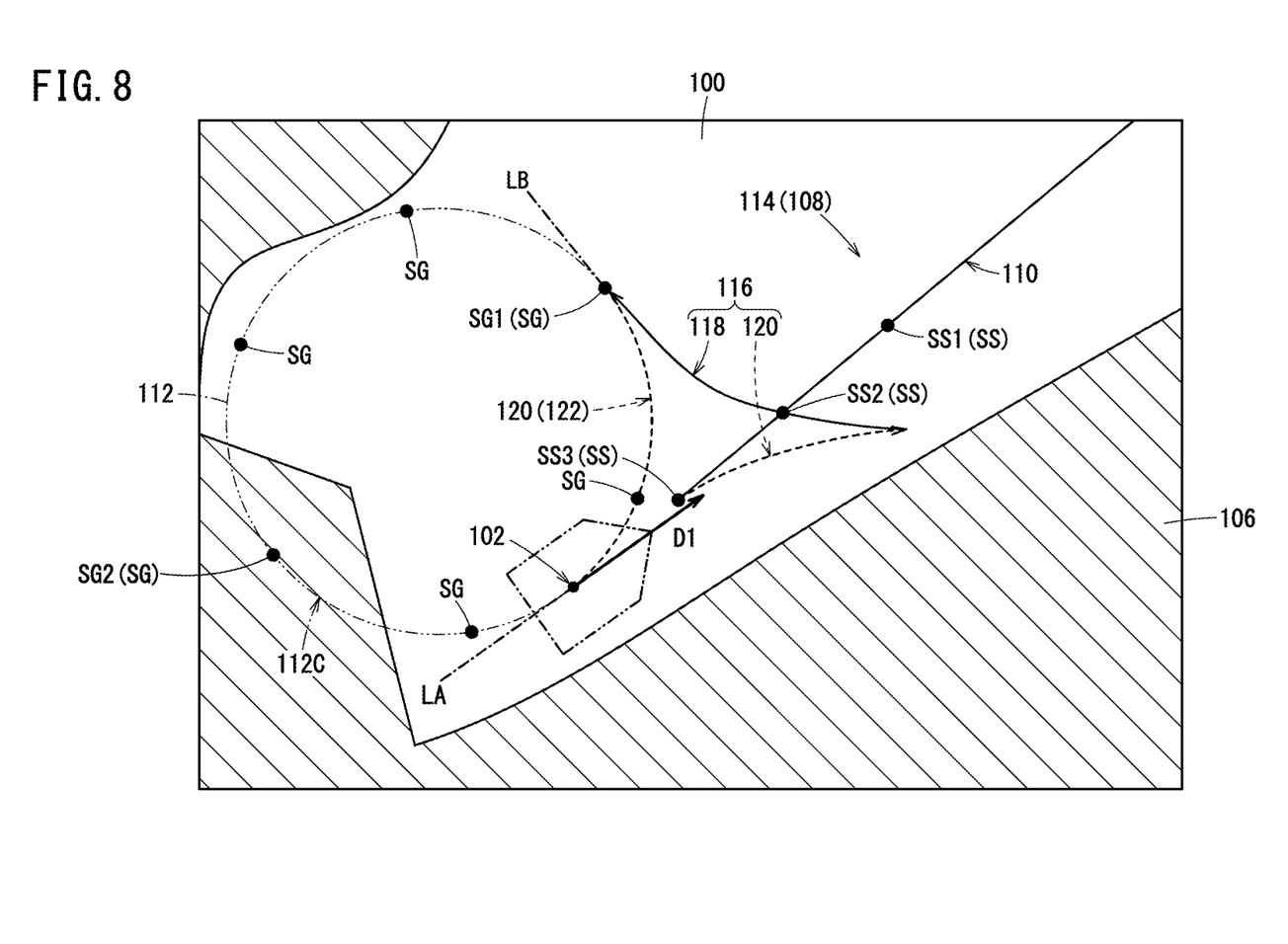
FIG. 8 is a plan view for explaining the method for generating the movement route.

Each of FIGS. 6 and 7 shows an example of the first sub-route candidate 116 along which the work machine 50 is to be moved from a sub-start position candidate SS2 different from the sub-start position candidate SS1 to the sub-goal position candidate SG1. FIG. 8 shows an example of the first sub-route candidate 116 along which the work machine 50 is to be moved from a sub-start position candidate SS3 to the sub-goal position candidate SG1.

The first sub-route candidate 116 shown in each of FIGS. 4 to 8 includes the sub-goal position candidate SG1 as an end point, but the present invention is not limited thereto. The route generation unit 20 may generate the first sub-route candidate 116 along which the work machine 50 is to be moved from any one of the plurality of sub-start position candidates SS to a sub-goal position candidate SG other than the sub-goal position candidate SG1.

A sub-goal position candidate SG2 shown in FIGS. 4 to 8, which is one of the plurality of sub-goal position candidates SG, is included in the travel restriction area 106. As described above, the route generation unit 20 does not use the sub-goal position candidates SG included in the travel restriction area 106 to generate the movement route 108. Therefore, the route generation unit 20 does not generate the first sub-route candidate 116 that is based on the sub-goal position candidate SG2.

The movement route candidate 114 further includes a second sub-route candidate 122. The second sub-route candidate 122 is a candidate for a route along which the work machine 50 is to be moved from the sub-goal position candidate SG, which is the end point of the first sub-route candidate 116, to the target work start position 102. The second sub-route candidate 122 is generated along the imaginary circle 112. When the radius of the imaginary circle 112 is equal to the minimum turning radius of the work machine 50, the length of the second sub-route candidate 122 is reduced.

The second sub-route candidate 122 is, for example, the backward route 120 along which the work machine 50 is turned backward along the imaginary circle 112, but may be the forward route 118 along which the work machine 50 is turned forward along the imaginary circle 112. When the second sub-route candidate 122 is formed by the backward route 120, the movement route candidate 114 for causing the work machine 50 to reach the target work start position 102 while moving backward (turning backward) is generated.

When the contact point between the imaginary circle 112 and the imaginary straight line LA does not coincide with the target work start position 102, the route generation unit 20 may include, in the second sub-route candidate 122, a route extending along the imaginary straight line LA from the contact point to the target work start position 102. As a result, even when the contact point between the imaginary circle 112 and the imaginary straight line LA does not coincide with the target work start position 102, the movement route candidate 114 that allows the work machine 50 to reach the target work start position 102 is generated.

According to the above-described first sub-route candidate 116, the orientation of the work machine 50 reaching the sub-goal position candidate SG is along the tangential direction of the imaginary circle 112. In addition, according to the above-described second sub-route candidate 122, since the work machine 50 moves along the imaginary circle 112, the orientation of the work machine 50 is maintained in the tangential direction of the imaginary circle 112. Therefore, by moving the work machine 50 along the movement route candidate 114 including the first sub-route candidate 116 and the second sub-route candidate 122, the orientation of the work machine 50 at the target work start position 102 is along the imaginary straight line LA. That is, according to the movement route candidate 114 generated by the route generation unit 20, the orientation of the work machine 50 at the target work start position 102 can be made to coincide with the planned traveling direction of the work machine 50 indicated by the target work start posture information.

Note that, as described above, the route generation unit 20 can generate a plurality of movement route candidates 114 by combining an arbitrary sub-start position candidate SS and an arbitrary sub-goal position candidate SG. The route generation unit 20 selects one of the plurality of movement route candidates 114 as the movement route 108. For example, the route generation unit 20 selects, as the movement route 108, the movement route candidate 114 along which the moving distance of the work machine 50 is minimized. As a result, it is possible to shorten the time required for the work machine 50 to move along the movement route 108. In addition, it is possible to suppress the amount of energy consumed for the work machine 50 to move along the movement route 108. For example, when the route generation unit 20 generates four movement route candidates 114 shown in FIGS. 5 to 8, the shortest movement route candidate 114 among the four movement route candidates 114 is assumed to be the movement route candidate 114 shown in FIG. 5. In this case, the route generation unit 20 selects the movement route candidate 114 shown in FIG. 5 as the movement route 108.

In this way, the route generation unit 20 generates the movement route 108 by appropriately combining the forward route 118 and the backward route 120 based on the work area information, the target work start position information, the target work start posture information, the current position information, and the current posture information.

By combining the forward route 118 and the backward route 120, the movement route 108 for causing the work machine 50 to make a turn can be generated. If the work machine 50 is caused to make a turn, it is possible to cause the work machine 50 to perform direction change without causing the work machine 50 to make a pivot turn. That is, if the work machine 50 is caused to make a turn, it is possible to cause the work machine 50 to change its posture while suppressing damage to the traveling surface of the work machine 50 (damage to the lawn grass).

The communication control unit 22 controls the communication unit 12 to transmit information (a route plan) indicating the movement route 108 generated by the route generation unit 20, to the communication device 54 provided in the work machine 50. As a result, it is possible for the control device 56 provided in the work machine 50 to acquire the route plan. The control device 56 can cause the work machine 50 to reach the target work start position 102 while placing the work machine 50 in the target work start posture, by causing the work machine 50 to travel based on the acquired route plan. The work machine 50 that has reached the target work start position 102 in the target work start posture can start the work smoothly.

Figure 9:
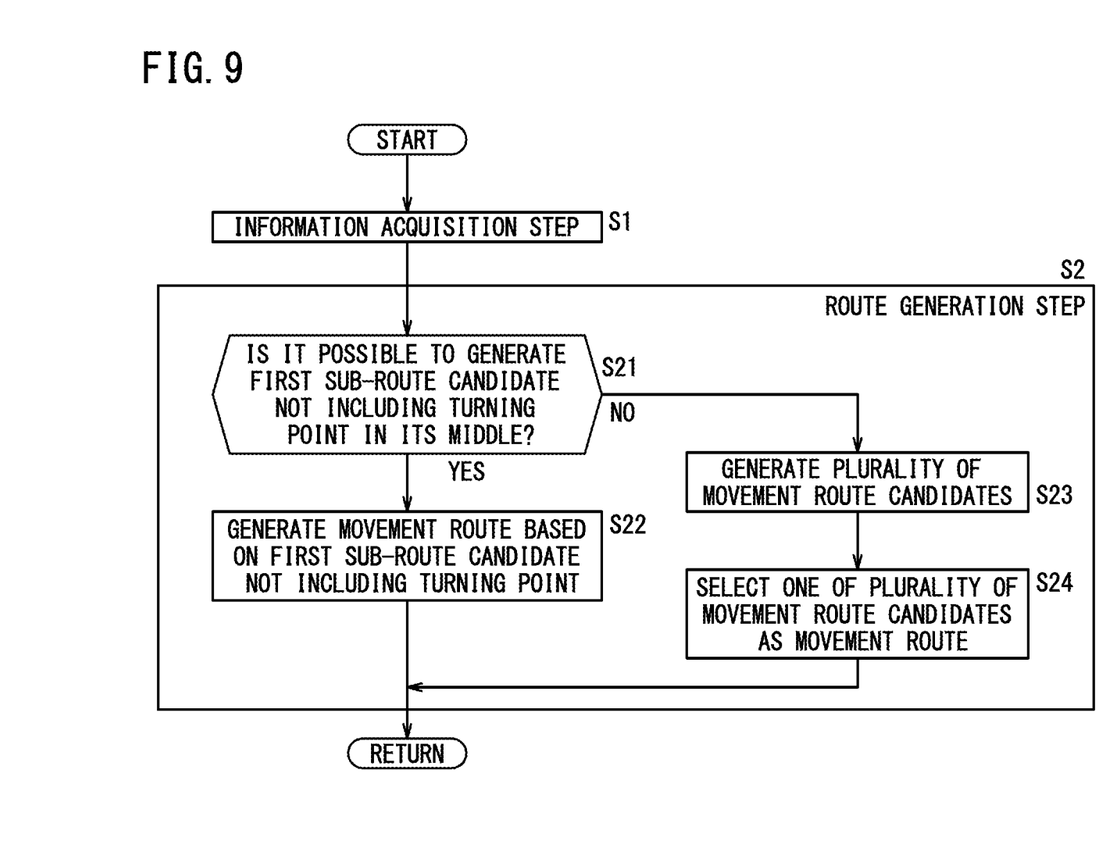
FIG. 9 is a flowchart showing a route planning method according to an embodiment.

FIG. 9 is a flowchart showing a route planning method according to an embodiment.

The route planning method includes an information acquisition step S1 and a route generation step S2. This route planning method is executed by the above-described route planning device 10.

In the information acquisition step S1, the information acquisition unit 18 acquires the target work start position information, the target work start posture information, the current position information, and the current posture information.

In the route generation step S2, the route generation unit 20 generates the movement route 108 for causing the work machine 50 to reach the target work start position 102 in the target work start posture. The route generation unit 20 generates the movement route 108 based on the target work start position information, the target work start posture information, the current position information, and the current posture information that are acquired in the information acquisition step S1. By appropriately combining the forward route 118 and the backward route 120, the route generation unit 20 can generate the movement route 108 for causing the work machine 50 to reach the target work start position 102 while the posture thereof is placed in the target work start posture. That is, the route generation unit 20 can generate the movement route 108 that allows the work machine 50 to reach the target work start position 102 in the target work start posture without causing the work machine 50 to make a pivot turn. In this manner, the route planning method of FIG. 9 ends.

Although not limited, in the route generation step S2, the route generation unit 20 may determine whether or not it is possible to generate the first sub-route candidate 116 that does not include, in the middle thereof, the turning point of the work machine 50 (S21). When it is possible to generate the first sub-route candidate 116 that does not include, in the middle thereof, the turning point of the work machine 50 (S21: YES), the route generation unit 20 may generate the movement route 108 that is based on this first sub-route candidate 116 (S22) and end the route generation step S2. In this case, a simple movement route 108 in which only the sub-goal position (the sub-goal position candidate SG) is set as the turning point of the work machine 50 is generated. When it is difficult to generate the first sub-route candidate 116 that does not include, in the middle thereof, the turning point of the work machine 50 (S21: NO), the route generation unit 20 may generate the movement route candidate 114 that includes the turning point in the middle of the first sub-route candidate 116. A plurality of such movement route candidates 114 may be generated (S23). When a plurality of the movement route candidates 114 are generated, one of the plurality of movement route candidates 114 is selected as the movement route 108 (S24).

The following notes (appendices) are further disclosed in relation to the above-described embodiment.

APPENDIX 1

The route planning device (10) according to the present disclosure includes one or more processors that execute computer-executable instructions stored in a memory, wherein the one or more processors execute the computer-executable instructions to cause the route planning device to: acquire the target work start position information indicating the target work start position (102) that is a target position at which the work machine (50) is caused to start work, the target work start posture information indicating the target work start posture that is a target posture of the work machine at the target work start position, the current position information indicating the current position (104) of the work machine, and the current posture information indicating the posture of the work machine at the current position; and generate the movement route (108) for causing the work machine to reach the target work start position in the target work start posture, by combining the forward route (118) along which the work machine moves forward and the backward route (120) along which the work machine moves backward, based on the target work start position information, the target work start posture information, the current position information, and the current posture information. According to this feature, it is possible to cause the work machine to reach the target work start position in the target work start posture.

APPENDIX 2

In the route planning device according to Appendix 1, the one or more processors may cause the route planning device to generate the movement route in a manner so that the work machine reaches the target work start position while moving backward.

APPENDIX 3

In the route planning device according to Appendix 1 or 2, the movement route may be formed by alternately arranging the forward route and the backward route. According to this feature, the work machine can be caused to make a turn, and is therefore not required to make a pivot turn.

APPENDIX 4

In the route planning device according to any one of Appendices 1 to 3, the forward route may be a route along which the work machine turns forward, the backward route may be a route along which the work machine turns backward, and the one or more processors may cause the route planning device to generate the movement route in a manner so that the work machine reaches the target work start position while turning backward.

APPENDIX 5

In the route planning device according to Appendix 4, the one or more processors may cause the route planning device to set the sub-goal position on the imaginary circle (112) passing through the target work start position, and to generate the movement route in a manner so that the work machine reaches the target work start position while turning backward along the imaginary circle from the sub-goal position.

APPENDIX 6

In the route planning device according to Appendix 5, the radius of the imaginary circle may be equivalent to the minimum turning radius of the work machine. According to this feature, since the moving distance of the work machine along the imaginary circle is minimized, the moving distance of the work machine is reduced.

APPENDIX 7

In the route planning device according to Appendix 5 or 6, the one or more processors may cause the route planning device to set the plurality of sub-goal position candidates (SG) on the imaginary circle, the plurality of sub-goal position candidates being candidates for the sub-goal position, and to select, as the movement route, one of the plurality of movement route candidates (114) each including one of the plurality of sub-goal position candidates as a turning point.

APPENDIX 8

In the route planning device according to Appendix 7, the one or more processors may cause the route planning device to select, as the movement route, the movement route candidate along which the moving distance of the work machine is minimized. According to this feature, the energy consumption of the work machine is suppressed.

APPENDIX 9

In the route planning device according to any one of Appendices 1 to 8, the one or more processors may cause the route planning device to further acquire the information indicating the work area (100) in which the work is performed by the work machine, and to generate the movement route in a manner so that the movement route is included in the work area. According to this feature, the movement route can be generated within a range in which the work machine is allowed to travel.

APPENDIX 10

In the route planning device according to Appendix 9, the work machine may be a lawn mower, and the work area may be an area in which lawn mowing is performed by the work machine.

APPENDIX 11

In the route planning device according to any one of Appendices 1 to 10, the route planning device may be provided in the work machine.

APPENDIX 12

In the route planning device according to any one of Appendices 1 to 11, the information indicating the movement route generated by the route planning device may be supplied to the work machine via the communication device (54) provided in the work machine.

APPENDIX 13

The route planning method according to the present disclosure includes: the step (S1) of acquiring the target work start position information indicating the target work start position (102) that is a target position at which the work machine (50) is caused to start work, the target work start posture information indicating the target work start posture that is a target posture of the work machine at the target work start position, the current position information indicating the current position (104) of the work machine, and the current posture information indicating the posture of the work machine at the current position; and the step (S2) of generating the movement route (108) for causing the work machine to reach the target work start position in the target work start posture, by combining the forward route (118) along which the work machine moves forward and the backward route (120) along which the work machine moves backward, based on the target work start position information, the target work start posture information, the current position information, and the current posture information. According to this feature, it is possible to cause the work machine to reach the target work start position in the target work start posture.

It should be noted that the present invention is not limited to the disclosure described above, and various configurations can be adopted therein without departing from the essence and gist of the present invention.

The invention claimed is:

1. A route planning device comprising one or more processors that execute computer-executable instructions stored in a memory,
   wherein the one or more processors execute the computer-executable instructions to cause the route planning device to:
   acquire target work start position information indicating a target work start position that is a target position at which a work machine is caused to start work,
   target work start posture information indicating a target work start posture that is a target posture of the work machine at the target work start position,
   current position information indicating a current position of the work machine, and current posture information indicating a posture of the work machine at the current position; and
   generate a movement route for causing the work machine to reach the target work start position in the target work start posture, by combining a forward route along which the work machine moves forward target work start posture and a backward route along which the work machine moves backward, based on the target work start position information, the target work start posture information, the current position information, and the current posture information, wherein the work machine is autonomously controlled to follow the generated movement route.

2. The route planning device according to claim 1, wherein
the one or more processors cause the route planning device to generate the movement route in a manner so that the work machine reaches the target work start position while moving backward.

3. The route planning device according to claim 1, wherein the movement route is formed by alternately arranging the forward route and the backward route.

4. The route planning device according to claim 1, wherein
the forward route is a route along which the work machine turns forward,
the backward route is a route along which the work machine turns backward, and
the one or more processors cause the route planning device to generate the movement route in a manner so that the work machine reaches the target work start position while turning backward.

5. The route planning device according to claim 4, wherein
the one or more processors cause the route planning device to:
set a sub-goal position on an imaginary circle passing through the target work start position; and
generate the movement route in a manner so that the work machine reaches the target work start position while turning backward along the imaginary circle from the sub-goal position.

6. The route planning device according to claim 5, wherein
a radius of the imaginary circle is equivalent to a minimum turning radius of the work machine.

7. The route planning device according to claim 5, wherein
the one or more processors cause the route planning device to:
set a plurality of sub-goal position candidates on the imaginary circle, the plurality of sub-goal position candidates being candidates for the sub-goal position; and
select, as the movement route, one of a plurality of movement route candidates each including one of the plurality of sub-goal position candidates as a turning point.

8. The route planning device according to claim 7, wherein
the one or more processors cause the route planning device to select, as the movement route, a movement route candidate along which a moving distance of the work machine is minimized, among the plurality of movement route candidates.

9. The route planning device according to claim 1, wherein
the one or more processors cause the route planning device to:
further acquire information indicating a work area in which the work is performed by the work machine; and
generate the movement route in a manner so that the movement route is included in the work area.

10. The route planning device according to claim 9, wherein
the work machine is a lawn mower, and
the work area is an area in which lawn mowing is performed by the work machine.

11. The route planning device according to claim 1, wherein
the route planning device is provided in the work machine.

12. The route planning device according to claim 1, wherein
information indicating the movement route generated by the route planning device is supplied to the work machine via a communication device provided in the work machine.

13. A route planning method comprising:
acquiring target work start position information indicating a target work start position that is a target position at which a work machine is caused to start work, target work start posture information indicating a target work start posture that is a target posture of the work machine at the target work start position, current position information indicating a current position of the work machine, and current posture information indicating a posture of the work machine at the current position; and
generating a movement route for causing the work machine to reach the target work start position in the target work start posture, by combining a forward route along which the work machine moves forward and a backward route along which the work machine moves backward, based on the target work start position information, the target work start posture information, the current position information, and the current posture information,
wherein the work machine is autonomously controlled to follow the generated movement route.

* * * * *